US008565363B1

(12) United States Patent
Eliaz

(10) Patent No.: US 8,565,363 B1
(45) Date of Patent: Oct. 22, 2013

(54) FINE PHASE ESTIMATION FOR HIGHLY SPECTRALLY EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,039

(22) Filed: Jan. 31, 2013

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H04L 7/00* (2006.01)
*H04L 25/00* (2006.01)
*H04L 25/40* (2006.01)

(52) U.S. Cl.
USPC .......................................... 375/371; 375/340

(58) Field of Classification Search
USPC ................... 375/316, 259, 290, 340, 371
See application file for complete search history.

(56) References Cited

U.S. PATENT DOCUMENTS

| | | | |
|---|---|---|---|
| 4,466,108 A * | 8/1984 | Rhodes ......................... | 375/329 |
| 6,335,954 B1 * | 1/2002 | Bottomley et al. .......... | 375/354 |
| 6,381,291 B1 * | 4/2002 | Yom ............................. | 375/350 |
| 6,535,549 B1 * | 3/2003 | Scott et al. .................... | 375/219 |
| 6,621,857 B1 * | 9/2003 | Belotserkovsky et al. ... | 375/149 |
| 6,654,432 B1 * | 11/2003 | O'Shea et al. ................ | 375/354 |
| 6,697,441 B1 * | 2/2004 | Bottomley et al. ........... | 375/340 |
| 7,205,798 B1 * | 4/2007 | Agarwal et al. .............. | 327/105 |
| 7,362,536 B1 * | 4/2008 | Liu et al. .................... | 360/77.02 |
| 2003/0026371 A1 * | 2/2003 | Laroia et al. .................. | 375/362 |
| 2003/0081704 A1 * | 5/2003 | Kim .............................. | 375/343 |
| 2008/0112513 A1 * | 5/2008 | Moon et al. ................... | 375/341 |
| 2008/0260014 A1 * | 10/2008 | Yang et al. .................... | 375/232 |

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Jean B Corrielus
(74) *Attorney, Agent, or Firm* — McAndrews, Held & Malloy, Ltd.

(57) ABSTRACT

A receiver may process a received signal to generate a processed received signal. The receiver may generate, during a sequence estimation process, an estimate of a phase error of the processed received signal. The receiver may generate an estimate of a value of a transmitted symbol corresponding to the received signal based on the estimated phase error. The generation of the estimate of the phase error may comprise generation of one or more phase candidate vectors. The generation of the estimate may comprise calculation of a metric based on the one or more phase candidate vectors. The calculation of the metric may comprise phase shifting the processed received signal based on the estimated phase error resulting in a phase-corrected received signal. The calculation of the metric may comprise calculating a Euclidean distance based on the phase-corrected received signal and one or more symbol candidate vectors.

22 Claims, 11 Drawing Sheets

(56) References Cited

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).
Intuitive Guide to Principles of Communications, www.complextoreal.com, Inter Symbol Interference (ISI) and Root-raised Cosine (RRC) filtering, (2002), pp. 1-23 (23 pages).
Chan, N., "Partial Response Signaling with a Maximum Likelihood Sequence Estimation Receiver" (1980). Open Access Dissertations and Theses. Paper 2855, (123 pages).
The Viterbi Algorithm, Ryan, M.S. and Nudd, G.R., Department of Computer Science, Univ. of Warwick, Coventry, (1993) (17 pages).
R. A. Gibby and J. W. Smith, "Some extensions of Nyquist's telegraph transmission theory," Bell Syst. Tech. J., vol. 44, pp. 1487-1510, Sep. 1965.
J. E. Mazo and H. J. Landau, "On the minimum distance problem for faster-than-Nyquist signaling," IEEE Trans. Inform. Theory, vol. 34, pp. 1420-1427, Nov. 1988.
D. Hajela, "On computing the minimum distance for faster than Nyquist signaling," IEEE Trans. Inform. Theory, vol. 36, pp. 289-295, Mar. 1990.
G. Ungerboeck, "Adaptive maximum-likelihood receiver for carrier modulated data-transmission systems," IEEE Trans. Commun., vol. 22, No. 5, pp. 624-636, May 1974.
G. D. Forney, Jr., "Maximum-likelihood sequence estimation of digital sequences in the presence of intersymbol interference," IEEE Trans. Inform. Theory, vol. 18, No. 2, pp. 363-378, May 1972.
A. Duel-Hallen and C. Heegard, "Delayed decision-feedback sequence estimation," IEEE Trans. Commun., vol. 37, pp. 428-436, May 1989.

M. V. Eyubog•lu and S. U. Qureshi, "Reduced-state sequence estimation with set partitioning and decision feedback," IEEE Trans. Commun., vol. 36, pp. 13-20, Jan. 1988.
W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.
W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.
Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.
S. Mita, M. Izumita, N. Doi, and Y. Eto, "Automatic equalizer for digital magnetic recording systems" IEEE Trans. Magn., vol. 25, pp. 3672-3674, 1987.
E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.
W. E. Ryan and A. Gutierrez, "Performance of adaptive Volterra equalizers on nonlinear magnetic recording channels," IEEE Trans. Magn., vol. 31, pp. 3054-3056, Nov. 1995.
X. Che, "Nonlinearity measurements and write precompensation studies for a PRML recording channel," IEEE Trans. Magn., vol. 31, pp. 3021-3026, Nov. 1995.
O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

\* cited by examiner

One-Step Candidate Selection.

FINE PHASE ESTIMATION FOR HIGHLY SPECTRALLY EFFICIENT COMMUNICATIONS

CLAIM OF PRIORITY

This patent application makes reference to, claims priority to and claims benefit from:

U.S. Provisional Patent Application Ser. No. 61/662,085 entitled "Apparatus and Method for Efficient Utilization of Bandwidth" and filed on Jun. 20, 2012;

U.S. Provisional Patent Application Ser. No. 61/726,099 entitled "Modulation Scheme Based on Partial Response" and filed on Nov. 14, 2012;

U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

Each of the above-identified applications is hereby incorporated herein by reference in its entirety.

INCORPORATION BY REFERENCE

This patent application also makes reference to:

U.S. patent application Ser. No. 13/754,964 titled "Low-Complexity, Highly-Spectrally-Efficient Communications," and filed on the same date as this application;

U.S. patent application Ser. No. 13/754,998 titled "Design and Optimization of Partial Response Pulse Shape Filter," and filed on the same date as this application;

U.S. patent application Ser. No. 13/755,001 titled "Constellation Map Optimization For Highly Spectrally Efficient Communications," and filed on the same date as this application;

U.S. patent application Ser. No. 13/755,008 titled "Dynamic Filter Adjustment for Highly-Spectrally-Efficient Communications," and filed on the same date as this application;

U.S. patent application Ser. No. 13/755,011 titled "Timing Synchronization for Reception of Highly-Spectrally-Efficient Communications," and filed on the same date as this application;

U.S. patent application Ser. No. 13/755,018 titled "Feed Forward Equalization for Highly-Spectrally-Efficient Communications," and filed on the same date as this application;

U.S. patent application Ser. No. 13/755,021 titled "Decision Feedback Equalizer for Highly-Spectrally-Efficient Communications," and filed on the same date as this application;

U.S. patent application Ser. No. 13/755,025 titled "Decision Feedback Equalizer with Multiple Cores for Highly-Spectrally-Efficient Communications," and filed on the same date as this application;

U.S. patent application Ser. No. 13/755,026 titled "Decision Feedback Equalizer Utilizing Symbol Error Rate Biased Adaptation Function for Highly-Spectrally-Efficient Communications," and filed on the same date as this application;

U.S. patent application Ser. No. 13/755,028 titled "Coarse Phase Estimation for Highly-Spectrally-Efficient Communications," and filed on the same date as this application;

U.S. patent application Ser. No. 13/755,039 titled "Fine Phase Estimation for Highly Spectrally Efficient Communications," and filed on the same date as this application; and U.S. patent application Ser. No. 13/755,043 titled "Joint Sequence Estimation of Symbol and Phase with High Tolerance of Nonlinearity," and filed on the same date as this application.

Each of the above stated applications is hereby incorporated herein by reference in its entirety.

TECHNICAL FIELD

Aspects of the present application relate to electronic communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for fine phase estimation for highly spectrally efficient communications, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
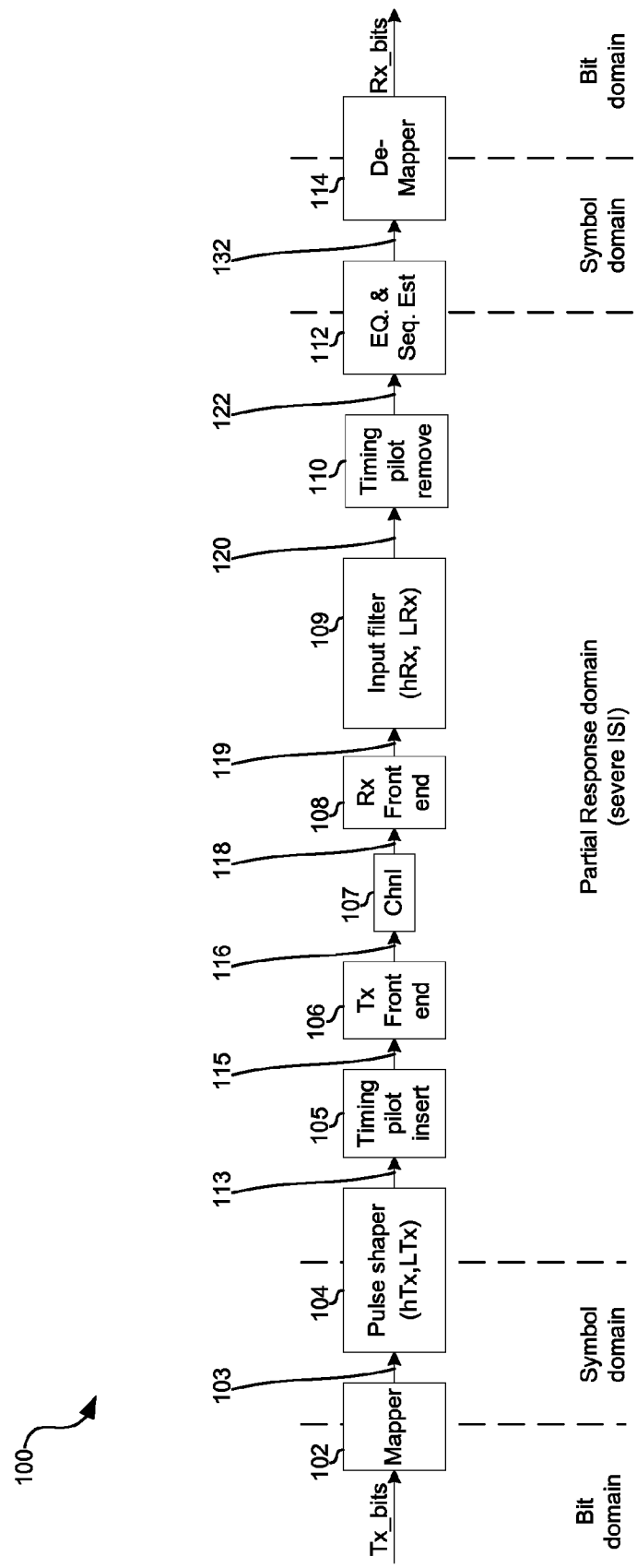
FIG. 1 is a block diagram depicting an example system configured for low-complexity, highly-spectrally-efficient communications.

FIG. 1 is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $Log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e., without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the pulse shaper 109 may be configured based on: a non-linearity model, $\widehat{Fnl}$, , signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $Log_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) dedecoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1 - P_b}\right),$$

where $P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 2:
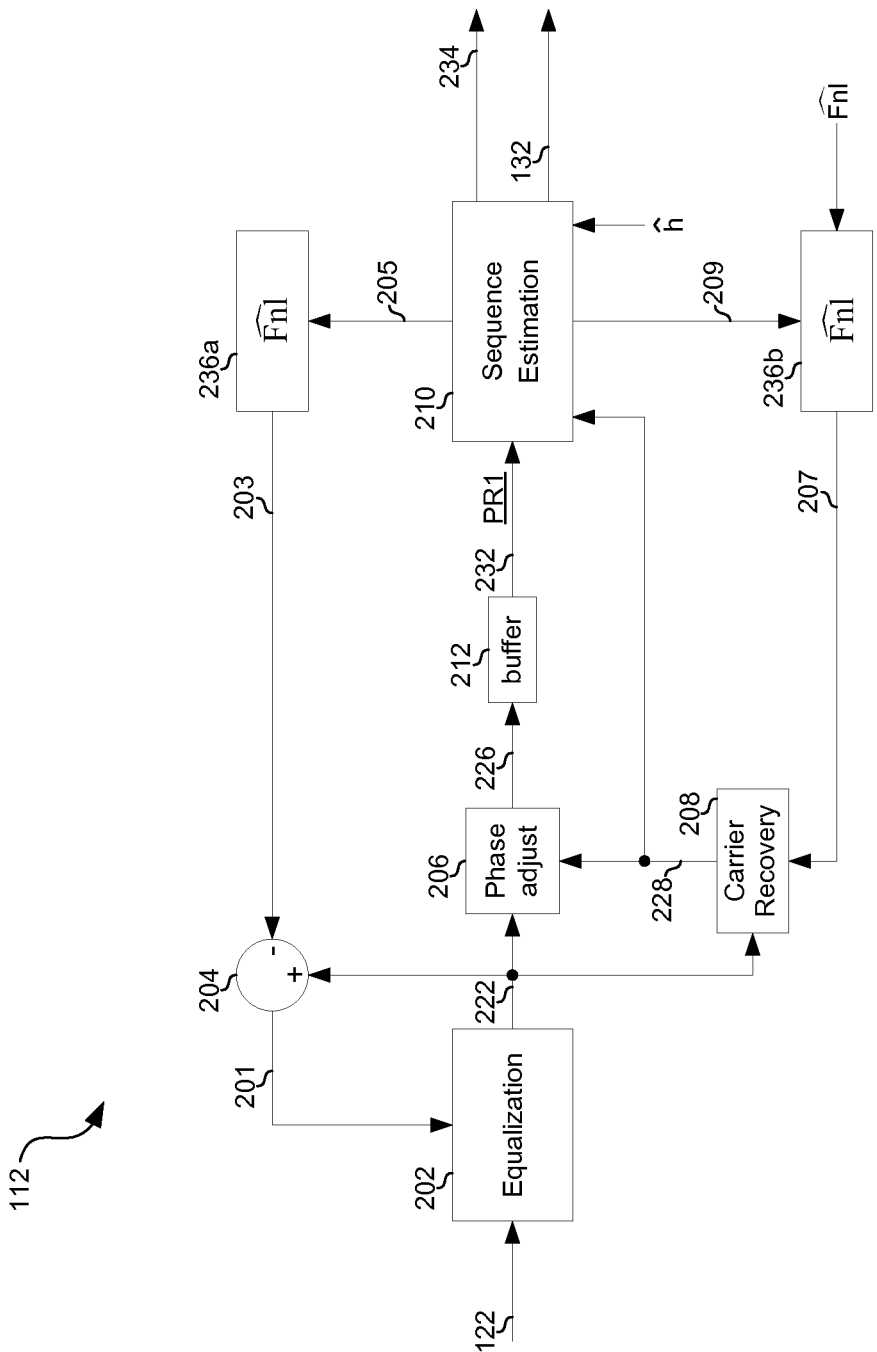
FIG. 2 is a block diagram depicting an example equalization and sequence estimation circuit for use in a system configured for low-complexity, highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response $\hat{h}$. Response $\hat{h}$ is based on h (the total partial response, discussed above). For example, response $\hat{h}$ may represent a compromise between h (described above) and a filter response that compensates for channel non-idealities such as multi-path. The response $\hat{h}$ may be conveyed and/or stored in the form of LTx+LRx−1 tap coefficients resulting from convolution of the LTx tap coefficients of the pulse shaper 104 and the LRx tap coefficients of the input filter 109. Alternatively, response $\hat{h}$ may be conveyed and/or stored in the form of fewer than LTx+LRx−1 tap coefficients—for example, where one or more taps of the LTx and LRx is ignored due to being below a determined threshold. The sequence estimation circuit 210 may output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

Figure 3:
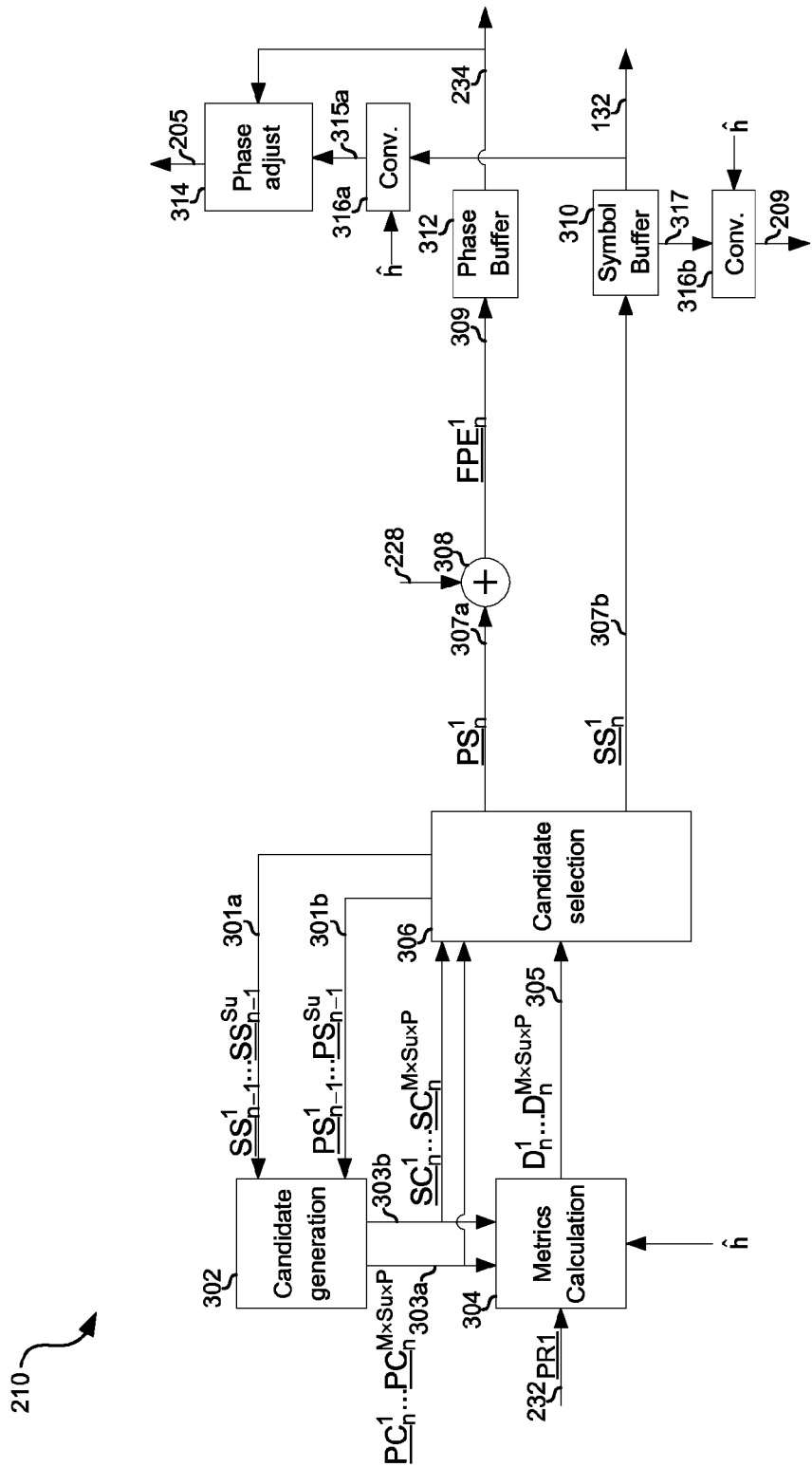
FIG. 3 is a block diagram depicting an example sequence estimation circuit for use in a system configured for low-complexity, highly-spectrally-efficient communications.

The non-linear modeling circuit 236a may apply a non-linearity function $\widehat{Fnl}$ (a model of the non-linearity seen by the received signal en route to the circuit 210) to the signal 205 resulting in the signal 203. Similarly, the non-linear modeling circuit 236b may apply the non-linearity function $\widehat{Fnl}$ to the signal 209 resulting in the signal 207. $\widehat{Fnl}$ may be, for example, a third-order or fifth-order polynomial. Increased accuracy resulting from the use of a higher-order polynomial for $\widehat{Fnl}$ may tradeoff with increased complexity of implementing a higher-order polynomial. Where FnlTx is the dominant non-linearity of the communication system 100, $\widehat{Fnl}$ modeling only FnlTx may be sufficient. Where degradation in receiver performance is above a threshold due to other non-linearities in the system (e.g., non-linearity of the receiver front-end 108) the model $\widehat{Fnl}$ may take into account such other non-linearities FIG. 3 is a block diagram depicting an example sequence estimation circuit for use in a system configured for low-complexity, highly-spectrally-efficient communications. Shown are a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su \times P}$ based on the partial response signal PR1, the signal 303a conveying the phase candidate vectors $PC_n^1 \ldots PC_n^{M \times Su \times P}$ and the signal 303b conveying the symbol candidate vectors $\underline{SC}_n^1 \ldots \underline{SC}_n^{M \times Su \times P}$, where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described below. In an example implementation, each phase candidate vector may comprise Q phase values and each symbol candidate vector may comprise Q symbols. An example implementation of the metrics calculation block is described below with reference to FIG. 4.

The candidate selection circuit 306 may be operable to select Su of the symbol candidates $\underline{SC}_n^1 \ldots \underline{SC}_n^{M \times Su \times P}$ and Su of the phase candidates $\underline{PC}_n^1 \ldots \underline{PC}_n^{M \times Su \times P}$ based on the metrics $D_n^1 \ldots D_n^{M \times Su \times P}$. The selected phase candidates are referred to as the phase survivors $\underline{PS}_n^1 \ldots \underline{PS}_n^{Su}$. Each element of each phase survivors $\underline{PS}_n^1 \ldots \underline{PS}_n^{Su}$ may correspond to an estimate of residual phase error in the signal 232. That is, the phase error remaining in the signal after coarse phase error correction via the phase adjust circuit 206. The best phase survivor $\underline{PS}_n^1$ is conveyed via signal 307a. The Su phase survivors are retained for the next iteration of the sequence estimation process (at which time they are conveyed via signal 301b). The selected symbol candidates are referred to as the symbol survivors $\underline{SS}_n^1 \ldots \underline{SS}_n^{Su}$. Each element of each symbol survivors $\underline{SS}_n^1 \ldots \underline{SS}_n^{Su}$ may comprise a soft-decision estimate and/or a hard-decision estimate of a symbol of the signal 232. The best symbol survivor $\underline{SS}_n^1 \ldots \underline{SS}_1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described below with reference to FIGS. 5D and 6A-6B.

The candidate generation circuit 302 may be operable to generate phase candidates $PC_n^1 \ldots PC_n^{M \times Su \times P}$ and symbol candidates $\underline{SC}_n^1 \ldots \underline{SC}_n^{M \times Su \times P}$ from phase survivors $PC_{n-1}^1 \ldots PC_{n-1}^{Su}$ and symbol survivors $\underline{SS}_{n-1}^1 \ldots \underline{SS}_{n-1}^{Su}$, wherein the index n−1 indicates that they are survivors from time n−1 are used for generating the candidates for time n. In an example implementation, generation of the phase and/or symbol candidates may be as, for example, described below with reference to FIGS. 5A and 5B and in the United States patent application titled "Fine Phase Estimation for Highly Spectrally Efficient Communications," which is incorporated herein by reference, as set forth above.

The symbol buffer circuit 310 may comprise a plurality of memory elements operable to store one or more symbol survivor elements of one or more symbol survivor vectors. The phase buffer circuit 312 may comprise a plurality of memory elements operable to store one or more phase survivor vectors. Example implementations of the buffers 310 and 312 are described below with reference to FIGS. 8A and 8B, respectively.

The combiner circuit 308 may be operable to combine the best phase survivor, $PS_n^1$, conveyed via signal 307a, with the signal 228 generated by the carrier recovery circuit 208 (FIG. 2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_n^1$.

The phase adjust circuit 314 may be operable to adjust the phase of the signal 315a by an amount determined by the signal 234 output by phase buffer 312, to generate the signal 205.

The circuit 316a, which performs a convolution, may comprise a FIR filter or IIR filter, for example. The circuit 316a may be operable to convolve the signal 132 with response $\hat{h}$, resulting in the partial response signal 315a. Similarly, the convolution circuit 316b may be operable to convolve the signal 317 with response $\hat{h}$, resulting in the partial response signal 209. As noted above, response $\hat{h}$ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). Response $\hat{h}$ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209b to compensate for non-linearity in the signal path.

Figure 4:
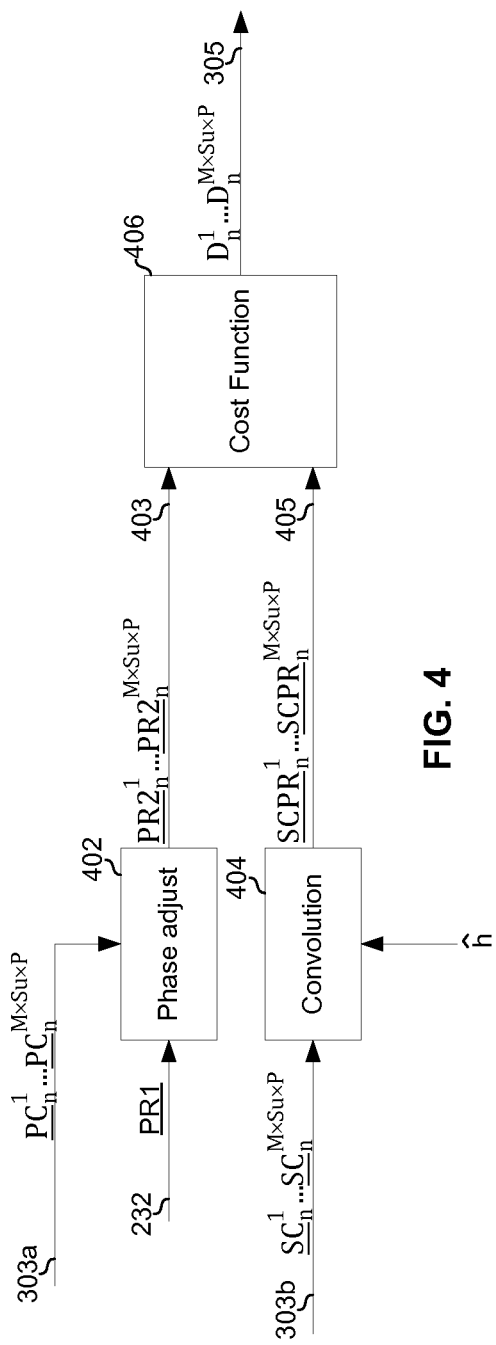
FIG. 4 is a block diagram depicting an example metric calculation circuit for use in a system configured for low-complexity, highly-spectrally-efficient communications.

FIG. 4 is a block diagram depicting an example metric calculation circuit for use in a system configured for low-complexity, highly-spectrally-efficient communications. Shown is a phase adjust circuit 402, a convolution circuit 404, and a cost function calculation circuit 406. The phase adjust circuit 402 may phase shift one or more elements of the vector PR1 (conveyed via signal 232) by a corresponding one or more values of the phase candidate vectors $PC_n^1 \ldots PC_n^{M \times Su \times P}$. The signal 403 output by the phase adjust circuit 402 thus conveys a plurality of partial response vectors $PR2_n^1 \ldots PR2_n^{M \times Su \times P}$ each of which comprises a plurality of phase-adjusted versions of PR1.

The circuit 404, which performs a convolution, may comprise a FIR filter or IIR filter, for example. The circuit 404 may be operable to convolve the symbol candidate vectors $SC_n^1 \ldots SC_n^{M \times Su \times P}$ with $\hat{h}$. The signal 405 output by the circuit 404 thus conveys vectors $SCPR_n^1 \ldots SCPR_n^{M \times Su \times P}$, each of which is a candidate partial response vector.

The cost function circuit 406 may be operable to generate metrics indicating the similarity between one or more of the partial response vectors $PR2_n^1 \ldots PR2_n^{M \times Su \times P}$ and one or more of the vectors $SCPR_n^1 \ldots SCPR_n^{M \times Su \times P}$ to generate error metrics $D_n^1 \ldots D_n^{M \times Su \times P}$. In an example implementation, the error metrics may be Euclidean distances calculated as shown below in equation 1.

$$D_n^i = |(\underline{SCPR}_n^i) - (\underline{PR2}_n^i)|^2 \qquad \text{EQ. 1}$$

for $1 \le i \le M \times Su \times P$.

FIGS. 5A-5D depict portions of an example sequence estimation process performed by a system configured for low-complexity, highly-spectrally-efficient communications. In FIGS. 5A-5D it is assumed, for purposes of illustration, that M=4 (a symbol alphabet of α, β, χ, δ), Su=3 (three symbol survivors are selected each iteration), Psu=Su (three phase survivors are selected each iteration), P=3 (a phase alphabet of plus, minus, and zero), and that Q (vector length) is 4.

Figure 5A:
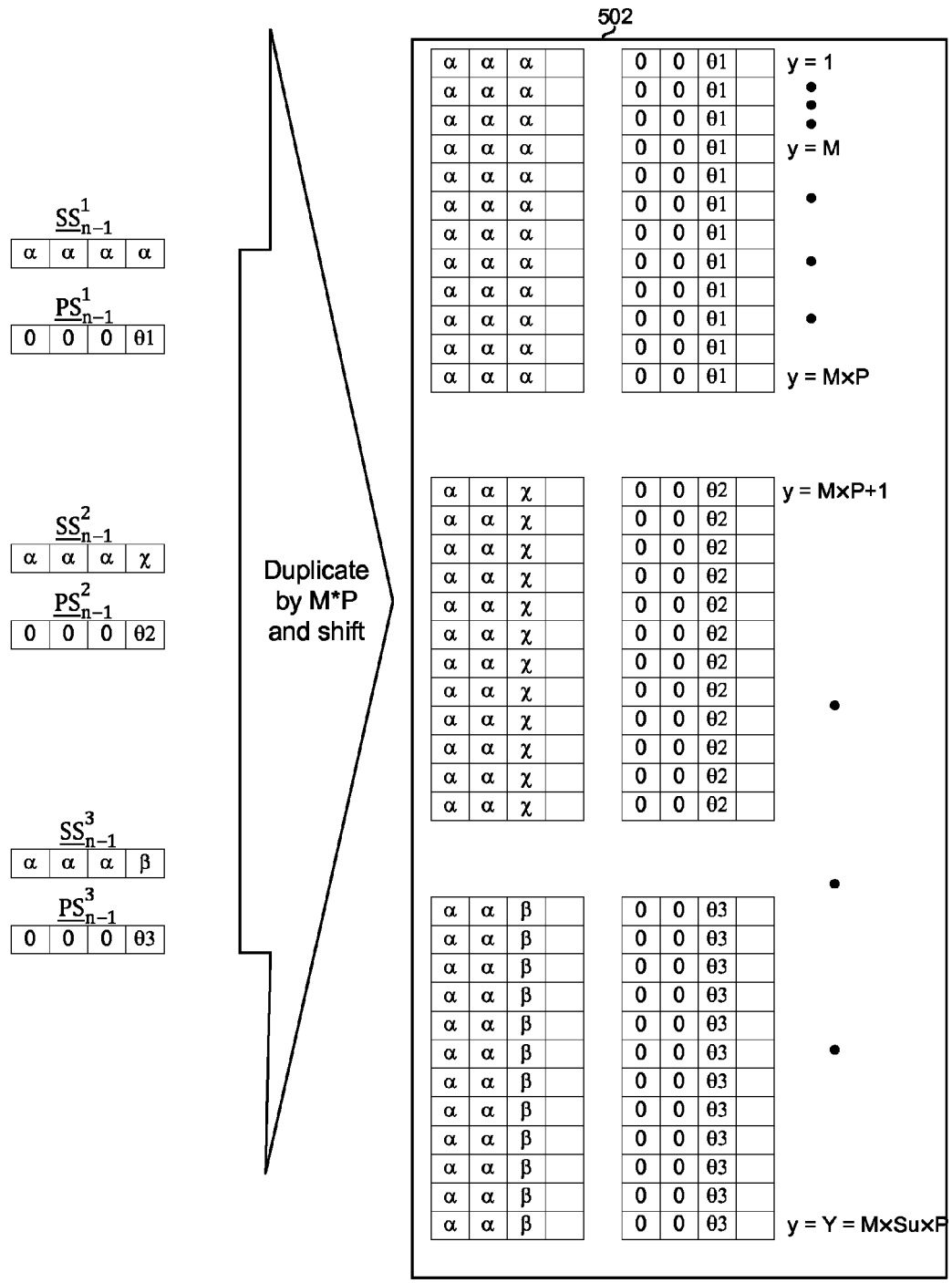
FIGS. 5A-5D depict portions of an example sequence estimation process performed by a system configured for low-complexity, highly-spectrally-efficient communications.

Referring to FIG. 5A, there is shown phase and symbol survivors from time n−1 on the left side of the figure. The first step in generating symbol candidates and phase candidates from the survivors is to duplicate the survivors and shift the contents to free up an element in each of the resulting vectors called out as 502 on the right side of FIG. 5A. In the example implementation depicted, the survivors are duplicated M*P−1 times and shifted one element.

Figure 5B:
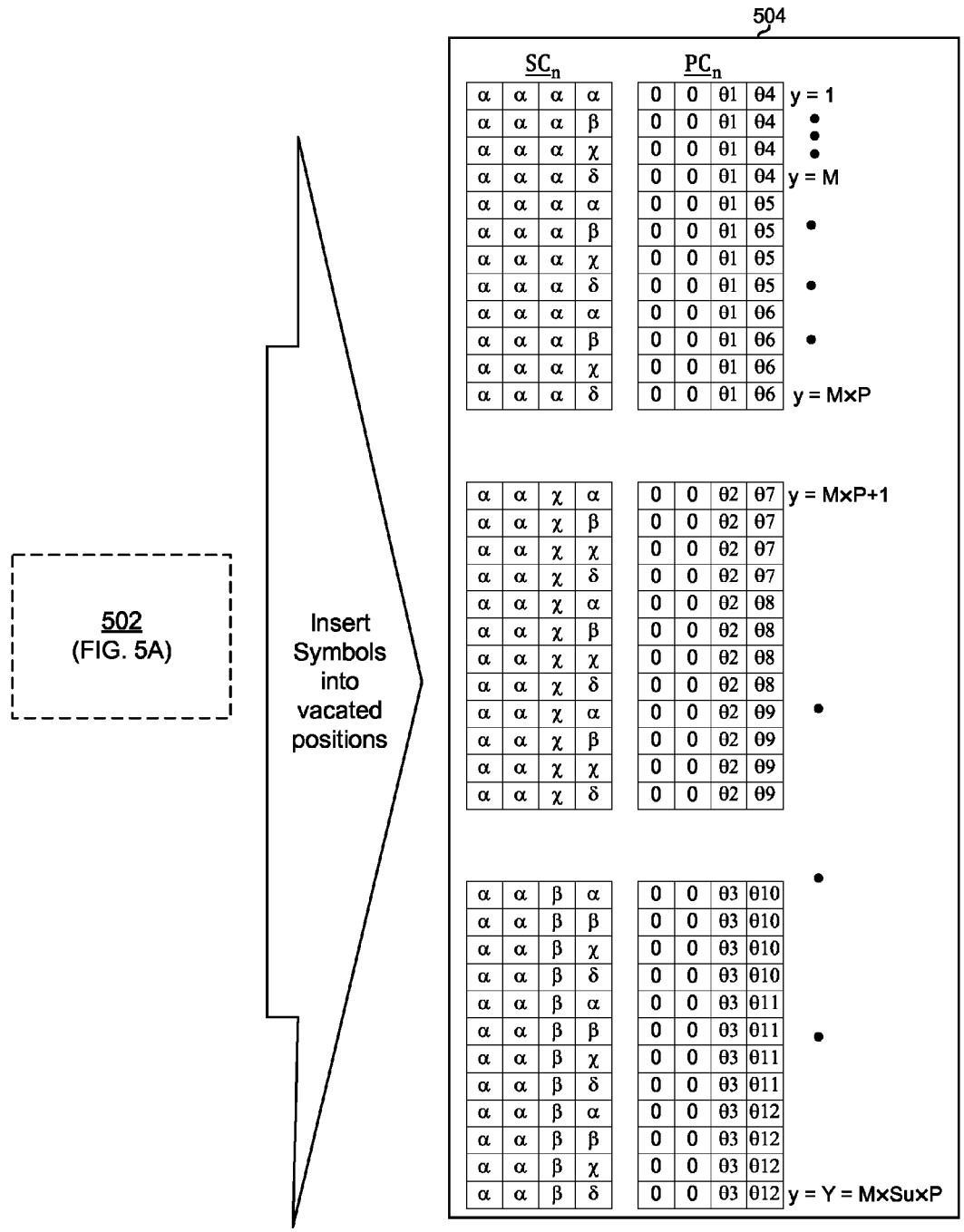

Referring to FIG. 5B, the next step in generating the candidates is inserting symbols in the vacant elements of the symbol vectors and phase values in the vacant elements of the phase vectors, resulting in the symbol candidates and phase candidate for time n (called out as 504 in FIG. 5B). In the example implementation depicted, each of the M possible symbol values is inserted into Su*P symbol candidates, and each of the P phase values may be inserted into M*Su candidates. In the example implementation depicted, θ5 is a reference phase value calculated based on phase survivor $PS_{n-1}^1$. For example, θ5 may be the average (or a weighted average) of the last two or more elements of the phase survivor $PS_{n-1}^1$ (in the example shown, the average over the last two elements would be (θ5+0)/2). In the example implementation depicted, θ4=θ5−Δθ, and θ6=θ5+Δθ, where Δθ is based on: the amount of phase noise in signal 226, slope (derivative) of the phase noise in signal 226, signal-to-noise ratio (SNR) of signal 226, and/or capacity of the channel 107. Similarly, in the example implementation shown, θ8 is a reference phase value calculated based on phase survivor $PS_{n-1}^2$, θ7=θ8−Δθ, θ9=θ8+Δθ, θ11 is a reference phase value calculated based on phase survivor $PS_{n-1}^3$, θ10=θ11−Δθ, and θ12=θ11+Δθ.

In the example implementation depicted in FIG. 5B, a single new phase value is written to each phase candidate on each iteration of the sequence estimation process. In another implementation, a plurality of new phase values may be written to each candidate on each iteration of the sequence estimation process. Such an implementation is described below with reference to FIGS. 6 and 7.

Figure 5C:
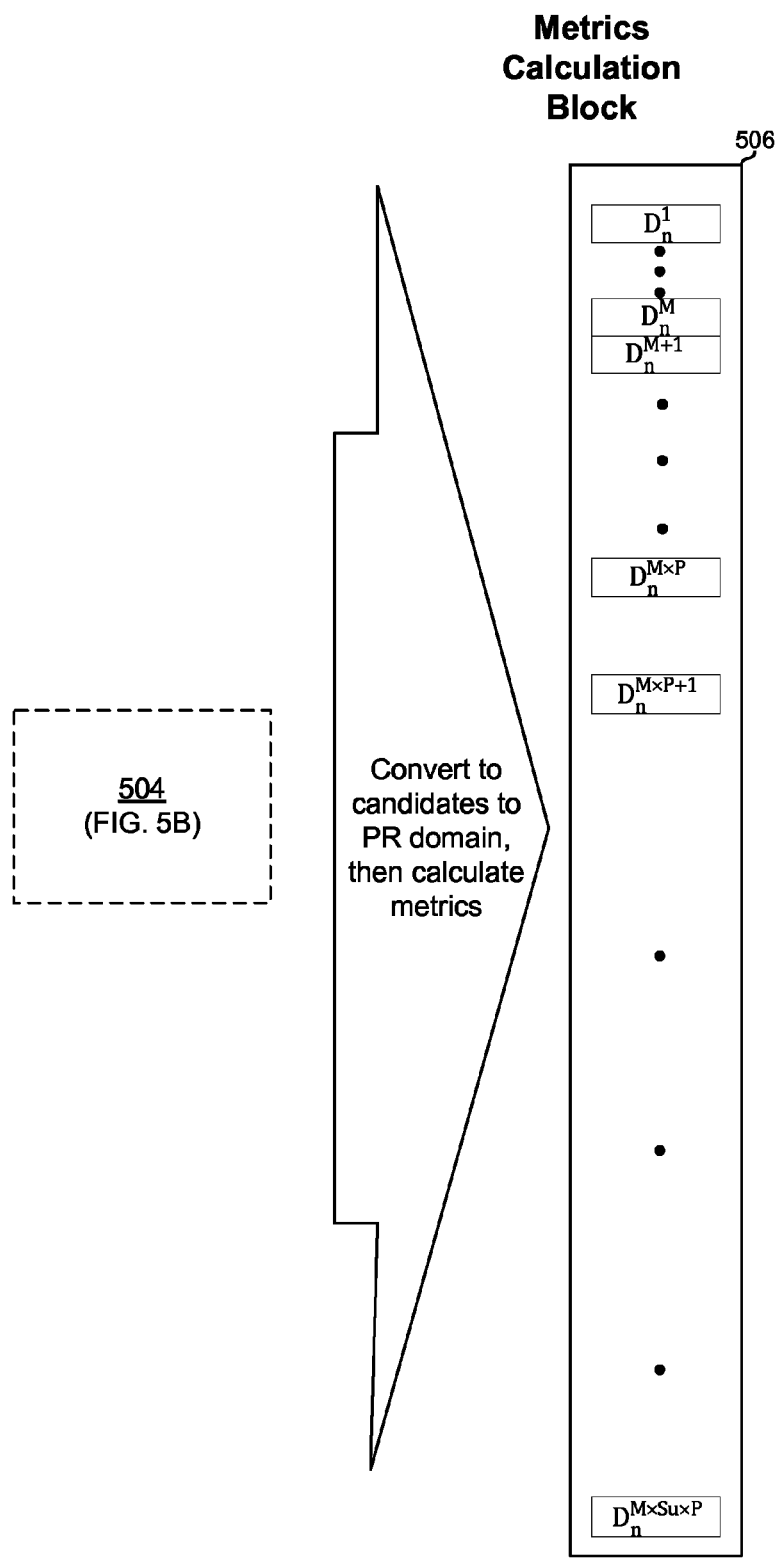

Referring to FIG. 5C, as described above with reference to FIG. 4, the symbol candidates are transformed to the partial response domain via a convolution, the reference signal PR1 is phase adjusted, and then the metrics $D_n^1 \ldots D_n^{M \times Su \times P}$ are calculated based on the partial response signals $PR2_n^1 \ldots PR2_n^{M \times Su \times P}$ and $SCPR_n^1 \ldots SCPR_n^{M \times Su \times P}$.

Figure 5D:
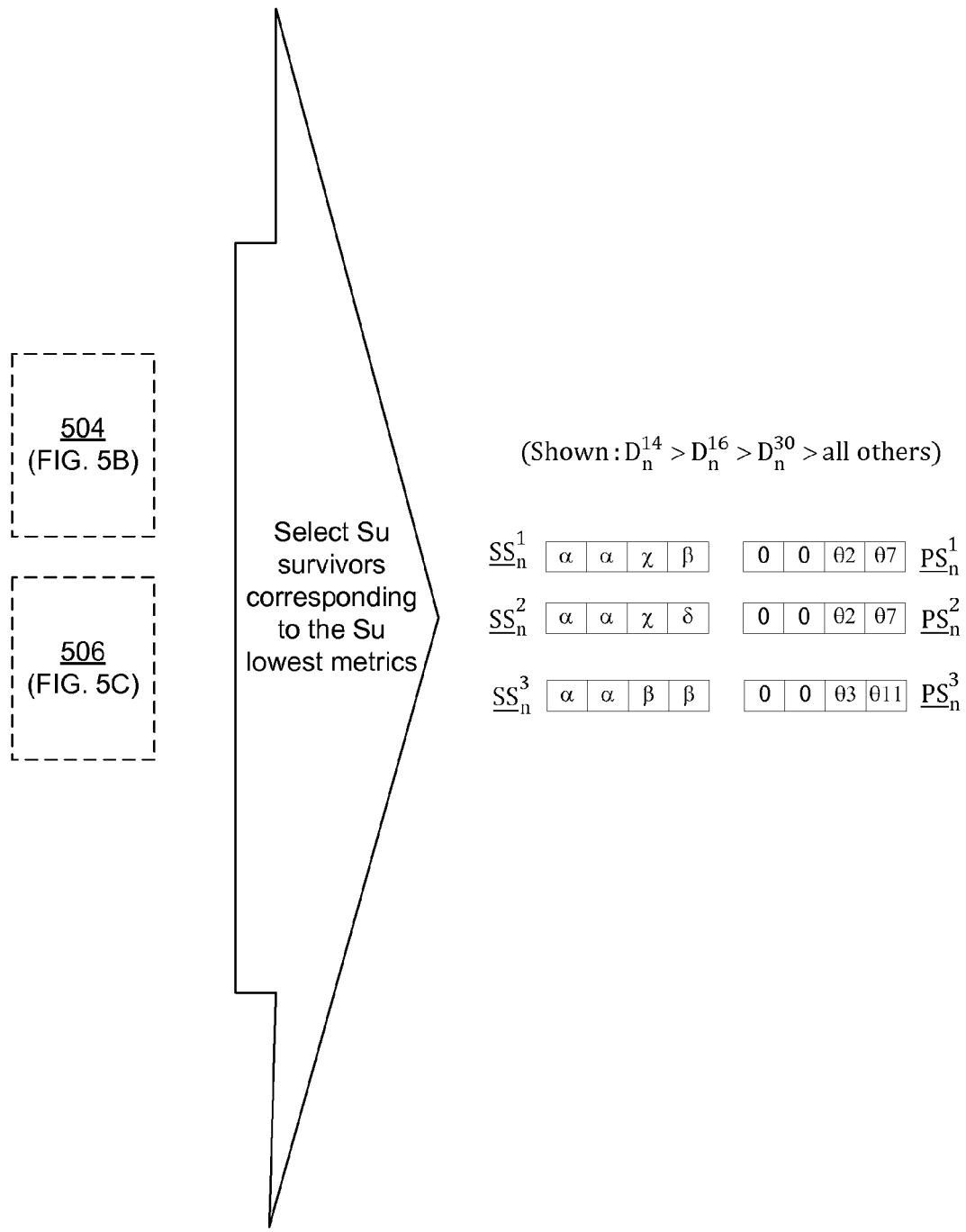

Referring to FIG. 5D, the metrics calculated in FIG. 5C are used to select which of the candidates generated in FIG. 5B are selected to be the survivors for the next iteration of the sequence estimation process. FIG. 5D depicts an example implementation in which the survivors are selected in a single step by simply selecting Su candidates corresponding to the Su best metrics. In the example implementation depicted, it is assumed that metric $D_n^{14}$ is the best metric, that $D_n^{16}$ is the second best metric, and that $D_n^{30}$ is the third-best metric. Accordingly, symbol candidate $SC_n^{14}$ is selected as the best symbol survivor, $PC_n^{14}$ is selected as the best phase survivor, symbol candidate $SC_n^{16}$ is selected as the second-best symbol survivor, $PC_n^{16}$ is selected as the second-best phase survivor, symbol candidate $SC_n^{30}$ is selected as the third-best symbol survivor, and $PC_n^{30}$ is selected as the third-best phase survivor. The survivor selection process of FIG. 5D may result in selecting identical symbol candidates which may be undesirable. An example survivor selection process that prevents redundant symbol survivors is described in the United States patent application titled "Low-Complexity, Highly-Spectrally-Efficient Communications," which is incorporated herein by reference, as set forth above.

Figure 6:
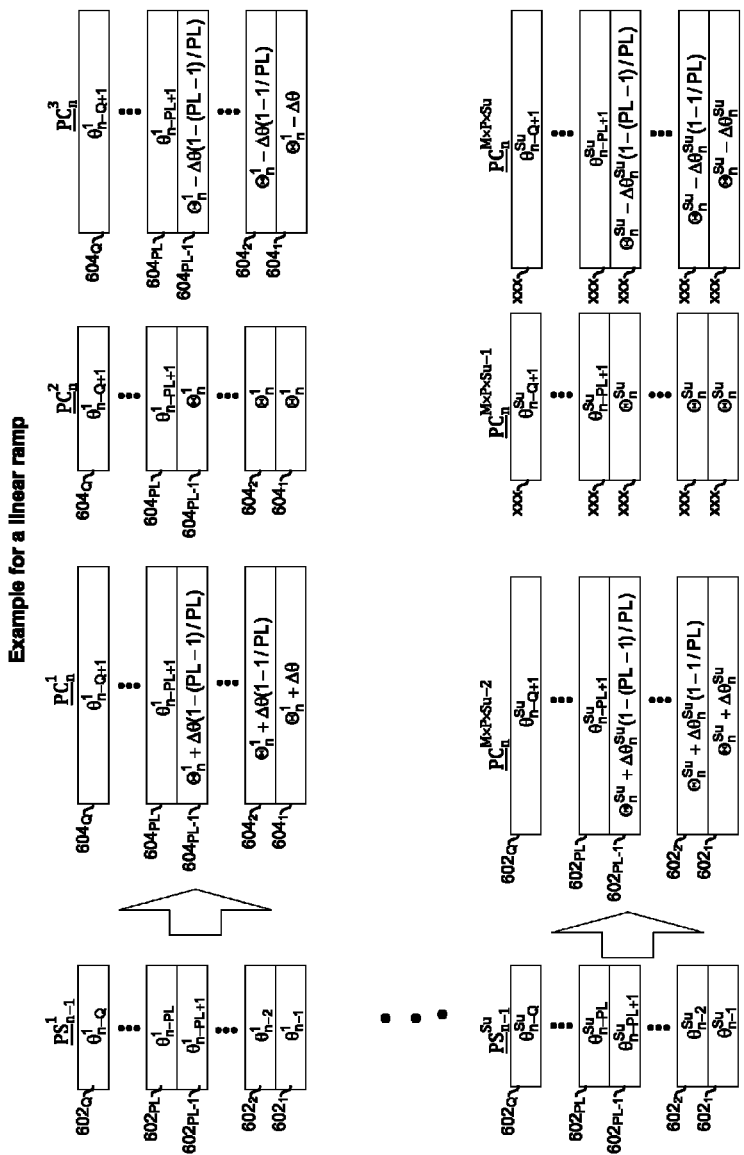
FIG. 6 depicts generation of phase candidates in a system configured for low-complexity, highly-spectrally-efficient communications.
Figure 7:
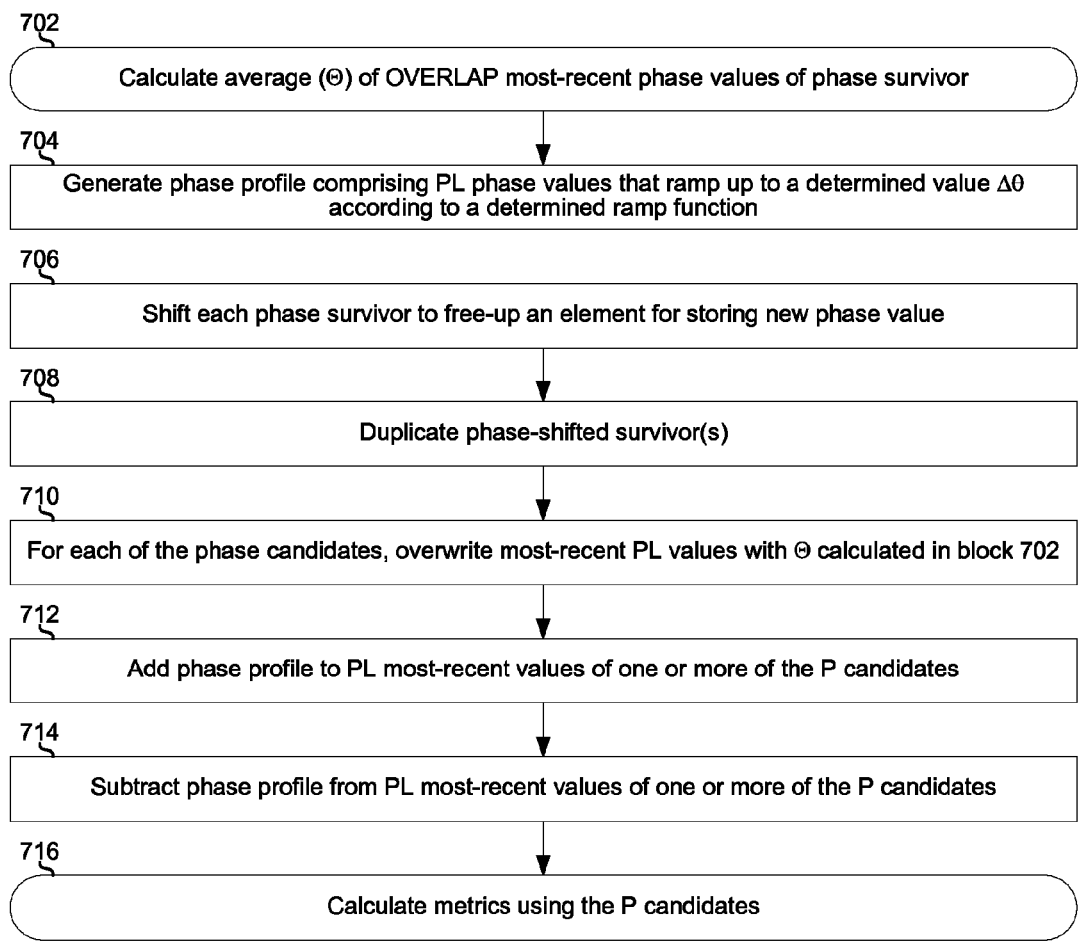
FIG. 7 is flowchart illustrating an example process for generation of phase candidates for use in a system configured for low-complexity, highly-spectrally-efficient communications.

FIG. 6 depicts generation of phase candidates in a system configured for low-complexity, highly-spectrally-efficient communications. Shown in FIG. 6 are a first, $PS_{n-1}^1$ and last, $PS_{n-1}^{Su}$, of Su phase survivor vectors resulting from the iteration of the sequence estimation process occurring at time n−1. Also shown in FIG. 6 are three (assuming P=3, for illustration) phase candidate vectors $Pc_n^1$, $PS_n^2$, and $PS_n^3$ generated from the phase survivor $PS_{n-1}^1$, and three phase candidate vectors $PC_n^{M \times P \times Su-2}$, $PC_n^{M \times P \times Su-1}$, and $PC_n^{M \times P \times Su}$ generated from the phase survivor $PS_{n-1}^{Su}$. The depicted phase candidates are the candidates for the iteration of the sequence estimation process occurring at time n. Generation of the phase candidates depicted in FIG. 6 is described with reference to the flowchart of FIG. 7.

The flowchart begins with block 702 in which an average of OVERLAP (an integer which may be predetermined and/or dynamically configured) entries of one or more phase survivors are calculated. For example, $\Theta_n^1$ in FIG. 6 may correspond to the average value of values $\theta_{n-1}^1 \ldots \theta_{n-1-OVERLAP}^1$ and $\Theta_n^{Su}$ may correspond to the average value of values $\theta_{n-1}^1 \ldots \theta_{n-1-OVERLAP}^1$.

In block 704, a phase profile (a vector) comprising PL elements (an integer which may be predetermined and/or dynamically configured) may be generated. The magnitude of the elements may ramp up from first element having a value that is zero, or near zero, to a $PL^{th}$ element having a value that is $\Delta\theta$ (a value that may be predetermined and/or dynamically configured). The values may, for example, ramp linearly or exponentially.

In block 706, each of the phase survivors $PS_{n-1}^1 \ldots PS_{n-1}^{Su}$ may be shifted by one element to free up the last element into which a new phase value may be stored.

In block 708, each of the phase-shifted survivors may be duplicated M×P times, resulting in M×P×Su phase candidates having a vacant last element.

In block 710, the each of the values calculated in block 702 may be written to the last PL elements (including the vacant element) of the M×P×Su phase candidates generated from the phase survivor to the average value corresponds (i.e., $\Theta_n^1$ is written to the last PL elements of the M×P phase candidates generated from $PS_{n-1}^1$, $\Theta_n^2$ is written to the last PL elements of the M×P phase candidates generated from $PS_{n-1}^2$, and so on).

In block 712, the phase profile generated in block 704 may be added, element-by element, to a first of the phase candidates. For example, in FIG. 6 a linear phase profile is added to elements of phase candidate $PC_n^1$.

In block 714, the phase profile generated in block 704 may be subtracted, element-by element, from a second of the phase candidates. For example, in FIG. 6 a linear phase profile is subtracted from elements of phase candidate $PC_n^3$.

In block 716, metrics are calculated using the generated phase candidates as, for example, described above with reference to FIG. 4.

In another implementation, P may be greater than three and multiple phase profiles. For example, P may be equal to five, a first phase profile may be generated using a first value of $\Delta\theta$, and a second profile may be generated using a second value of $\Delta\theta$. In such an implementation, the first profile may be added to a first phase candidate and subtracted from a second phase candidate, and the second profile may be added to a third phase candidate and subtracted from a fourth candidate.

Figure 8:
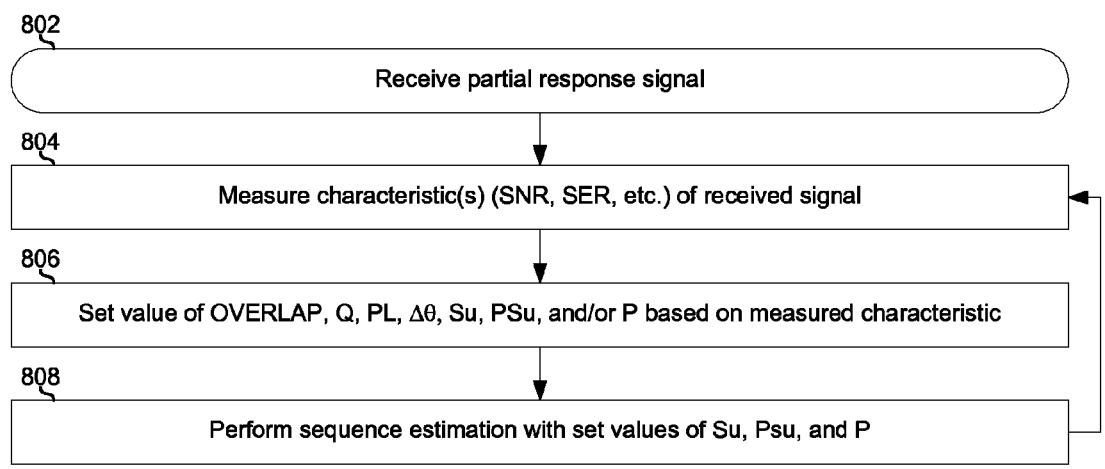
FIG. 8 is a flowchart illustrating an example process for dynamic configuration of parameters used in a sequence estimation process of a system configured for low-complexity, highly-spectrally-efficient communications.

FIG. 8 is a flowchart illustrating an example process for dynamic configuration of parameters used in a sequence estimation process of a system configured for low-complexity, highly-spectrally-efficient communications. The process begins with block 802 when a partial response signal received by a receiver (e.g., a receiver comprising components 108, 109, 110, 112, and 114). Next, in block 804, characteristics (e.g., signal-to-noise ratio, symbol error rate, bit error rate, etc.) of the received signal are measured (e.g., in the front-end 108 and/or by a digital signal processing circuit downstream from the de-mapper 114). For example, the metrics calculated by the sequence estimation circuit 112 may be used in generating an estimate of SNR. In block 806, a value one or more parameters (e.g., Su, PSu, P, Q, PL, OVERLAP, and/or AO) may be configured based on the characteristics measured in block 804 and/or based on metrics calculated by the sequence estimation circuit 112. Parameters may be configured during run-time (e.g., in, or near, real-time) based, for example, on recently received signals, signals currently being received, metrics calculated by the sequence estimation circuit 112 for recently-received signals, and/or metrics calculated by the sequence estimation circuit 112 for signals currently being received. In block 808, sequence estimation may be performed on the received signal using the parameter values determined in block 806.

In an example implementation of this disclosure, a receiver may process (e.g., equalize, phase correct, and/or buffer) a received signal (e.g., 122) to generate a processed received signal (e.g., 232). The receiver may generate, during a sequence estimation process, an estimate (e.g., $PS_n^1$) of a phase error of the processed received signal. The receiver may generate an estimate (e.g., an estimate output via signal 132) of a value of a transmitted symbol corresponding to the received signal based on the estimated phase error. The generation of the estimate of the phase error may comprise generation of one or more phase candidate vectors (e.g., $PC_n^1 \ldots PC_n^{M \times Su \times P}$). The generation of the estimate may comprise calculation of a metric (e.g., one of $D_n^1 \ldots D_n^{M \times Su \times P}$) based on the one or more phase candidate vectors. The calculation of the metric may comprise phase shifting (e.g., via circuit 402) the processed received signal based on the estimated phase error resulting in a phase-corrected received signal (e.g., $PR2_n^1 \ldots PR2_n^{M \times Su \times P}$). The calculation of the metric may comprise calculating a Euclidean distance (E.g., via circuit 406) based on the phase-corrected received signal and one or more symbol candidate vectors (e.g., $SC_n^1 \ldots SC_n^{M \times Su \times P}$).

During each iteration of the sequence estimation process, at least three metrics may be generated. A first metric may correspond to a first phase candidate vector (e.g., $PC_n^1$ in FIG. 6) having phase values positively shifted relative to corresponding phase values of a corresponding phase survivor vector. A second one of the metrics may correspond to a second phase candidate vector (e.g., $PC_n^3$, in FIG. 6) having phase values negatively shifted relative to the corresponding phase values of the corresponding phase survivor vector. A third one of the metrics corresponds to a third phase candidate vector (e.g., $Pc_n^2$ in FIG. 6) having phase values that are the same as the corresponding phase values of the corresponding phase survivor vector.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Methods and systems disclosed herein may be realized in hardware, software, or a combination of hardware and software. Methods and systems disclosed herein may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out methods described herein. Another typical implementation may comprise an application specific integrated circuit (ASIC) or chip with a program or other code that, when being loaded and executed, controls the ASIC such that is carries out methods described herein.

While methods and systems have been described herein with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
processing, in a receiver, a received inter-symbol correlated (ISC) signal, said processing resulting in a processed received ISC signal;
generating, via a sequence estimation process performed by said receiver, an estimate of a phase error of said processed received ISC signal; and
generating an estimate of a value of a transmitted symbol corresponding to said received ISC signal based on said estimate of said phase error;
wherein:
said generating said estimate of said chase error comprises generating one or more phase candidate vectors;
said generating said estimate of said phase error comprises calculating a metric based on said one or more phase candidate vectors;
said calculating said metric comprises phase shifting said processed received ISC signal based on said estimate of said phase error, said phase shifting resulting in a phase-corrected received ISC signal; and
said calculating said metric comprises calculating a Euclidean distance based on said phase-corrected received ISC signal and one or more symbol candidate vectors.

2. The method of claim 1, wherein said received ISC signal is a partial response signal generated via a partial response filter.

3. A method comprising:
processing, in a receiver, a received inter-symbol correlated (ISC) signal, said processing resulting in a processed received ISC signal;
generating, via a sequence estimation process performed by said receiver, an estimate of a phase error of said processed received ISC signal;
generating an estimate of a value of a transmitted symbol corresponding to said received ISC signal based on said estimate of said phase error,
wherein:
said generating said estimate of said phase error comprises generating one or more phase candidate vectors; and
said generating said estimate of said phase error comprises calculating a metric based on said one or more phase candidate vectors; and
determining how many of said phase candidate vectors to generate based on a measured performance indicator associated with said received ISC signal.

4. The method of claim 3, wherein said received ISC signal is a partial response signal generated via a partial response filter.

5. A method comprising:
processing, in a receiver, a received inter-symbol correlated (ISC) signal, said processing resulting in a processed received ISC signal;
generating, via a sequence estimation process performed by said receiver, an estimate of a phase error of said processed received ISC signal; and
generating an estimate of a value of a transmitted symbol corresponding to said received ISC signal based on said estimate of said phase error;
wherein:
said generating said estimate of said phase error comprises generating one or more phase candidate vectors;
said generating said estimate of said phase error comprises calculating a metric based on said one or more phase candidate vectors; and
a magnitude of a phase shift between a last two or more elements of said one or more phase candidate vectors and a reference value ramps according to a phase profile.

6. The method of claim 5, wherein said received ISC signal is a partial response signal generated via a partial response filter.

7. The method of claim 5, comprising determining characteristics of said phase profile based on a measured performance indicator associated with said received ISC signal.

8. A method comprising:
processing, in a receiver, a received inter-symbol correlated (ISC) signal, said processing resulting in a processed received ISC signal;

generating, via a sequence estimation process performed by said receiver, an estimate of a phase error of said processed received ISC signal;

generating an estimate of a value of a transmitted symbol corresponding to said received ISC signal based on said estimate of said phase error; and generating at least two metrics during each iteration of said sequence estimation process, wherein:
- a first phase candidate vector, a second phase candidate vector, and a third candidate vector are generated from a phase survivor vector;
- a first one of said metrics corresponds to a first phase candidate vector having phase values positively shifted relative to an average phase value of two or more elements of said phase survivor vector;
- a second one of said metrics corresponds to a second phase candidate vector having phase values negatively shifted relative to said average phase value of two or more elements of said phase survivor vector; and
- a third one of said metrics corresponds to a third phase candidate vector having phase values equal to said average phase value of two or more elements of said phase survivor vector.

9. The method of claim 8, comprising selecting, as a phase survivor vector, the one of: said first phase candidate vector, said second phase candidate vector, and said third phase candidate vector that corresponds to the best one of said metrics.

10. The method of claim 8, wherein said received ISC signal is a partial response signal generated via a partial response filter.

11. A system comprising:
a signal processing circuit operable to process a received inter-symbol correlated (ISC) signal, said processing resulting in a processed received ISC signal; and
a sequence estimation circuit operable to:
- generate, via a sequence estimation process, an estimate of a phase error of said processed received ISC signal,
- generate an estimate of a value of a transmitted symbol corresponding to said received ISC signal based on said estimate of said phase error,
- as part of said generation of said estimate of said phase error, generate one or more phase candidate vectors;
- as part of said generation of said estimate of said phase error, calculate a metric based on said one or more phase candidate vectors;
- as part of said calculation of said metric, phase shift said processed received ISC signal based on said estimate of said phase error, said phase shift resulting in a phase-corrected received ISC signal; and
- as part of said calculation of said metric, calculate a Euclidean distance based on said phase-corrected received ISC signal and one or more symbol candidate vectors.

12. The system of claim 11, wherein said received ISC signal is a partial response signal generated via a partial response filter.

13. A system comprising:
a signal processing circuit operable to process a received inter-symbol correlated (ISC) signal, said processing resulting in a processed received ISC signal; and
a sequence estimation circuit operable to:
- generate, via a sequence estimation process, an estimate of a phase error of said processed received ISC signal,
- generate an estimate of a value of a transmitted symbol corresponding to said received ISC signal based on said estimate of said phase error,
- as part of said generation of said estimate of said phase error, generate one or more phase candidate vectors;
- as part of said generation of said estimate of said phase error, calculate a metric based on said one or more phase candidate vectors; and
- determine how many of said phase candidate vectors to generate based on a measured performance indicator associated with said received ISC signal.

14. The system of claim 13, wherein said received ISC signal is a partial response signal generated via a partial response filter.

15. A system comprising:
a signal processing circuit operable to process a received inter-symbol correlated (ISC) signal, said processing resulting in a processed received ISC signal; and
a sequence estimation circuit operable to:
- generate, via a sequence estimation process, an estimate of a phase error of said processed received ISC signal,
- generate an estimate of a value of a transmitted symbol corresponding to said received ISC signal based on said estimate of said phase error,
- as part of said generation of said estimate of said phase error, generate one or more phase candidate vectors; and
- as part of said generation of said estimate of said phase error, calculate a metric based on said one or more phase candidate vectors;
wherein a magnitude of a phase shift between a last two or more elements of said one or more phase candidate vectors and a reference value ramps according to a phase profile.

16. The system of claim 15, wherein said received ISC signal is a partial response signal generated via a partial response filter.

17. The system of claim 15, wherein said system is operable to determine characteristics of said phase profile based on a measured performance indicator associated with said received ISC signal.

18. A system comprising:
a signal processing circuit operable to process a received inter-symbol correlated (ISC) signal, said processing resulting in a processed received ISC signal; and
a sequence estimation circuit operable to:
- generate, via a sequence estimation process, an estimate of a phase error of said processed received ISC signal,
- generate an estimate of a value of a transmitted symbol corresponding to said received ISC signal based on said estimate of said phase error; and
- generate at least two metrics during each iteration of said sequence estimation process, wherein:
  - a first phase candidate vector, a second phase candidate vector, and a third candidate vector are generated from a phase survivor vector;
  - a first one of said metrics corresponds to a first phase candidate vector having phase values positively shifted relative to an average phase value of two or more elements of said phase survivor vector;
  - a second one of said metrics corresponds to a second phase candidate vector having phase values negatively shifted relative to said average phase value of two or more elements of said phase survivor vector; and
  - a third one of said metrics corresponds to a third phase candidate vector having phase values equal to said average phase value of two or more elements of said phase survivor vector.

19. The system of claim 18, wherein said sequence estimation circuit is operable to select, as a phase survivor vector, the one of: said first phase candidate vector, said second phase candidate vector, and said third phase candidate vector that corresponds to the best one of said metrics.

20. The system of claim 18, wherein said received ISC signal is a partial response signal generated via a partial response filter.

21. A receiver comprising:
   a phase adjustment circuit operable to coarsely correct a phase error of a received inter-symbol correlated (ISC) signal, said coarsely correcting resulting in a coarse-phase-corrected received ISC signal; and
   a sequence estimation circuit operable to:
      generate, via a sequence estimation process, an estimate of a residual phase error of said coarse-phase-corrected received ISC signal;
      generate an estimate of a value of a transmitted symbol corresponding to said received ISC signal based on said estimate of said residual phase error;
      as part of said generation of said estimate of said residual phase error, generate one or more phase candidate vectors;
      as part of said generation of said estimate of said residual phase error, calculate a metric based on one or more phase candidate vectors;
      as part of said calculation of said metric, phase shift said coarse-phase-corrected received ISC signal based on said estimate of said residual phase error, said phase shift resulting in a fine-phase-corrected received ISC signal; and
      as part of said calculation of said metric, calculate a Euclidean distance based on said fine-phase-corrected received ISC signal and one or more symbol candidate vectors.

22. The receiver of claim 21, wherein said received ISC signal is a partial response signal generated via a partial response filter.

* * * * *